(12) United States Patent
Fukutomi

(10) Patent No.: US 8,818,094 B2
(45) Date of Patent: Aug. 26, 2014

(54) IMAGE PROCESSING APPARATUS, IMAGE PROCESSING METHOD AND RECORDING DEVICE RECORDING IMAGE PROCESSING PROGRAM

(75) Inventor: Takeshi Fukutomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 100 days.

(21) Appl. No.: 13/610,494

(22) Filed: Sep. 11, 2012

(65) Prior Publication Data

US 2013/0071019 A1    Mar. 21, 2013

(30) Foreign Application Priority Data

Sep. 21, 2011  (JP) ................................. 2011-205607

(51) Int. Cl.
*G06K 9/00*    (2006.01)

(52) U.S. Cl.
USPC ........................................................ 382/168

(58) Field of Classification Search
USPC ........................... 382/168, 169, 274; 358/522
See application file for complete search history.

(56) References Cited

U.S. PATENT DOCUMENTS

| | | | |
|---|---|---|---|
| 8,493,458 B2* | 7/2013 | Matsunaga | 348/218.1 |
| 2009/0304279 A1* | 12/2009 | Mori | 382/169 |
| 2010/0026825 A1* | 2/2010 | Doida | 348/222.1 |
| 2010/0111414 A1* | 5/2010 | Aragaki et al. | 382/167 |
| 2010/0123731 A1* | 5/2010 | Morimoto | 345/589 |

FOREIGN PATENT DOCUMENTS

JP    1-314389 A    12/1989

* cited by examiner

*Primary Examiner* — Phuoc Tran
(74) *Attorney, Agent, or Firm* — Holtz Holtz Goodman & Chick PC

(57) ABSTRACT

An image processing apparatus includes a histogram extension processing unit for performing a first tone conversion processing on an input image using a first tone conversion characteristic so that a variance of a histogram of an image after the first tone conversion processing is larger than that of a histogram of the input image before the first tone conversion processing; and a posterization processing unit for performing a second tone conversion processing on the image processed in the histogram extension processing unit using a second tone conversion characteristic in which a relation of an output value to an input value is defined by a step function, thereby generating a posterized image whose tone number is reduced as compared with the image before the second tone conversion processing.

13 Claims, 11 Drawing Sheets

IMAGE PROCESSING APPARATUS, IMAGE PROCESSING METHOD AND RECORDING DEVICE RECORDING IMAGE PROCESSING PROGRAM

FIELD OF THE INVENTION

The present invention relates to a technology for obtaining a painterly image by performing a processing of reducing the tone number (that is, number of tones or gradations) of an image.

BACKGROUND OF THE INVENTION

Image data obtained by inputting an image by an image input device such as a digital still camera, a movie camera or a scanner has a bit depth of, e.g. 8 bits, for example, for each color of B (blue), G (green) and R (red). Thus, an image with a tone characteristic close to that of conventional silver-salt pictures can be obtained. In this specification, such an image is called a picture quality image.

Image data are excellent in processability since being numerical data. Taking advantage of this characteristic, various processing is applied to image data to obtain images expressed in more various manners. As an example is known a method for obtaining a painterly image by intentionally reducing the tone number (i.e. number of tones or gradations) of a picture quality image. In reducing the tone number of the picture quality image, a posterization processing is performed. A tone curve is applied in changing the tone characteristic of an image. The tone curve determines a tone conversion characteristic in determining each tone value (output value) of an output image in correspondence with each tone value (input value) of an input image. By setting the shape of this tone curve not to be a continuous straight line or curve, but to be a discrete step function, a posterized output image can be obtained.

The posterization processing is performed to divide a range of input values from a minimum value to a maximum value into a finite number of zones and determine an output value corresponding to each divided zone as a tone conversion characteristic. The posterization processing derives pixel values of an output image in correspondence with those of an input image based on the tone conversion characteristic. As a result of the posterization processing, pixel values falling within a certain zone of an input image are consolidated into one pixel value representing that zone. As a result, the tone of a generated image becomes discrete (stepwise) and an image like a painting can be obtained.

JP01-314389A1 discloses a technology for color converting R, G and B data into hue, lightness and saturation data, reducing the tone numbers of the hue, lightness and saturation data and inversely converting these data into R, G and B data again in obtaining an illustrated image by performing a posterization processing.

SUMMARY OF THE INVENTION

An image processing apparatus according to one aspect of this invention comprises: a histogram extension processing unit for performing a first tone conversion processing on an input image using a first tone conversion characteristic so that a variance of a histogram of pixel values relating to an image after the first tone conversion processing is larger than that of a histogram of pixel values relating to the image before the first tone conversion processing; and a posterization processing unit for performing a second tone conversion processing on the image processed in the histogram extension processing unit using a second tone conversion characteristic in which a relation of an output value to an input value is defined by a step function, thereby generating a posterized image whose tone number is reduced as compared with the image before the second tone conversion processing.

An image processing method according to another aspect of this invention comprises: performing a first tone conversion processing on an input image using a first tone conversion characteristic so that a variance of a histogram of pixel values relating to an image after the first tone conversion processing is larger than that of a histogram of pixel values relating to the image before the first tone conversion processing; and performing a second tone conversion processing on the image, on which the first tone conversion processing is performed, using a second tone conversion characteristic in which a relation of an output value to an input value is defined by a step function, thereby generating a posterized image whose tone number is reduced as compared with the image before the second tone conversion processing.

A computer readable recording device according to still another aspect of this invention comprises an image processing program encoded and recorded in a computer-readable format and configured to generate a posterized image from an input image. The image processing program causes a computer to perform a method comprising: a histogram distribution extension processing step of performing a first tone conversion processing on the input image using a first tone conversion characteristic so that a variance of a histogram of pixel values relating to an image after the first tone conversion processing is larger than that of a histogram of pixel values relating to the image before the first tone conversion processing; and a posterization processing step of performing a second tone conversion processing on the image subjected to the first tone conversion processing, using a second tone conversion characteristic in which a relation of an output value to an input value is defined by a step function, thereby generating a posterized image whose tone number is reduced as compared with the image before the second tone conversion processing.

The details as well as other features and advantages of this invention are set forth in the remainder of the specification and are shown in the accompanying drawings.

BRIEF DESCRIPTION OF THE DRAWINGS

FIGS. 4A to 4C conceptually show an example of a histogram flattening processing, wherein FIG. 4A shows a tone histogram (gradation histogram) of an input image before the histogram flattening processing, FIG. 4B shows a cumulative frequency derived from the tone histogram shown in FIG. 4A and FIG. 4C shows a tone histogram after the histogram flattening processing.

FIGS. 8A to 8D conceptually show a method for setting a target histogram, wherein FIG. 8A shows a tone histogram of an input image before the histogram flattening processing, FIG. 8B shows a cumulative frequency derived from the tone histogram shown in FIG. 8A, FIG. 8C shows a tone histogram after the histogram flattening processing and FIG. 8D is a graph showing an example of setting the target histogram to extend a distribution of pixel values belonging to a certain range to a desired distribution range.

FIGS. 9A and 9B conceptually show a method for determining a tone conversion characteristic based on the set target histogram, wherein FIG. 9A shows a cumulative density function derived from the target histogram shown in FIG. 8D and FIG. 9B is a graph showing a state where an inverse function of the cumulative density function is set as a tone conversion characteristic.

DESCRIPTION OF THE PREFERRED EMBODIMENTS

Figure 1:
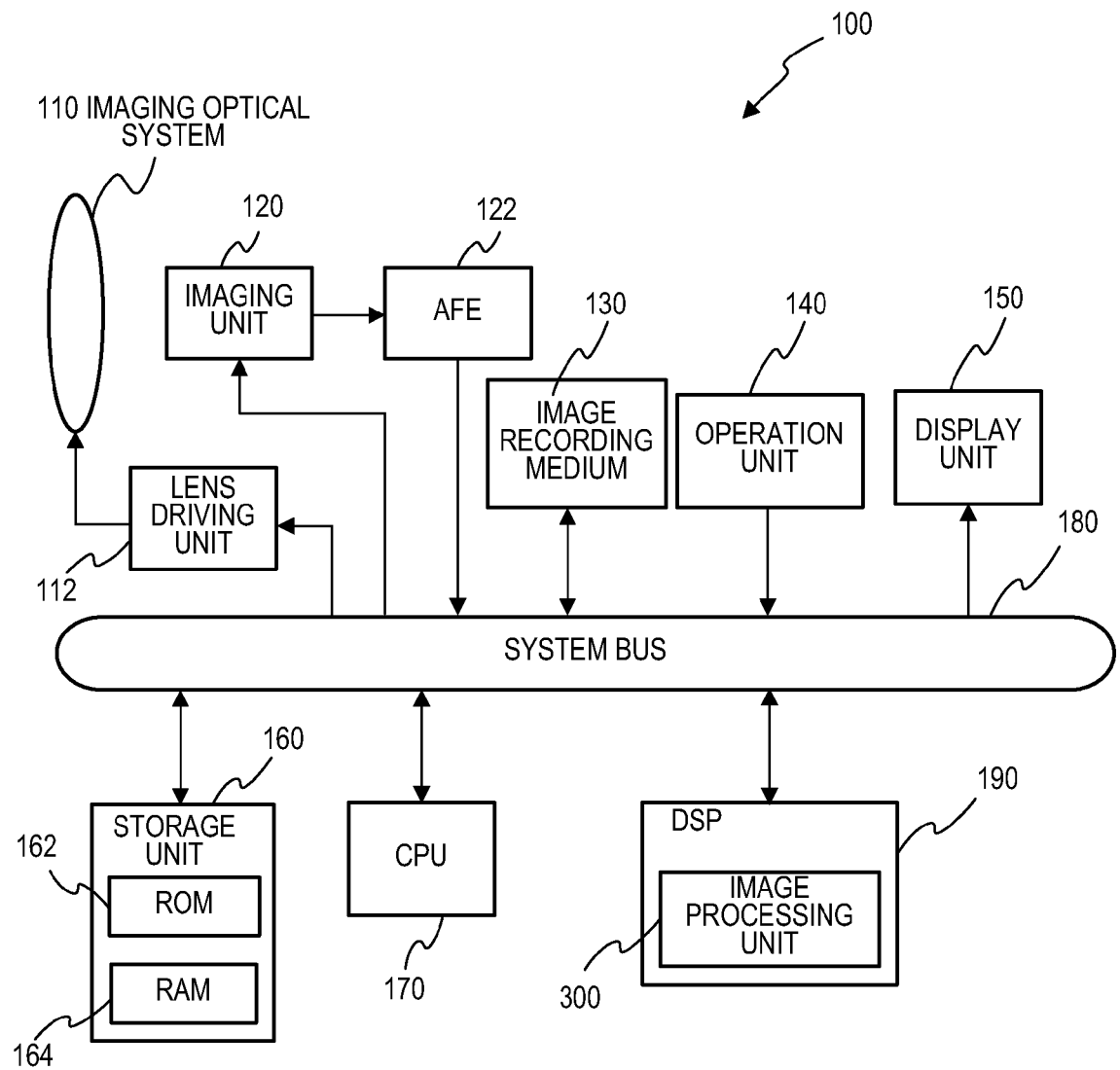
FIG. 1 is a block diagram showing a schematic configuration of a digital camera.

FIG. 1 is a block diagram showing a schematic configuration of a digital camera 100. The digital camera 100 may be a still camera or a movie camera. Alternatively, it may be a camera to be incorporated into a mobile phone or the like. When the digital camera 100 is a still camera or a movie camera, a taking lens may be fixed or interchangeable.

The digital camera 100 includes an imaging optical system 110, a lens driving unit 112, an imaging unit 120, an analog front end (written as "AFE" in FIG. 1) 122, an image recording medium 130, an operation unit 140, a display unit 150, a storage unit 160, a CPU 170, a DSP (digital signal processor) 190 and a system bus 180. The storage unit 160 includes a ROM 162 and a RAM 164. An image processing unit 300 is mounted in the DSP 190.

The lens driving unit 112, the imaging unit 120, the analog front end 122, the image recording medium 130, the operation unit 140, the display unit 150, the storage unit 160, the CPU 170 and the DSP 190 are electrically connected via the system bus 180. The RAM 164 is accessible by both the CPU 170 and the DSP 190.

The imaging optical system 110 forms a subject image on a light receiving area of the imaging unit 120. The lens driving unit 112 focuses the imaging optical system 110. Further, if the imaging optical system 110 is a variable focal length optical system, the imaging optical system 110 may change a focal length by being driven by the lens driving unit 112.

The imaging unit 120 includes a shutter and an imaging element, and subject light having passed through the imaging optical system 110 is incident on the imaging element while the shutter is open. The subject image formed on the light receiving area of the imaging element is photoelectrically converted to generate an analog image signal. Note that the shutter may not necessarily be provided if the imaging element has an electronic shutter function of electrically controlling an exposure time (photoelectric conversion time).

The analog image signal is input to the analog front end (AFE) 122. The analog front end 122 performs processing such as noise reduction, amplification and A/D conversion on the image signal input from the imaging unit 120 to generate a digital image signal. This digital image signal is temporarily stored in the RAM 164.

The DSP 190 applies various digital signal processing such as demosaicing, tone conversion, color balance correction, shading correction and noise reduction to the digital image signal temporarily stored in the RAM 164 and, if necessary, records the processed digital image signal in the image recording medium 130 or outputs it to the display unit 150.

The image recording medium 130 includes a flash memory, a magnetic recording device or the like and is detachably mounted into the digital camera 100. Alternatively, the image recording medium 130 may be built in the digital camera 100. In such a case, an area for recording image data may be secured in the ROM 162 and this area may be the image recording medium 130.

The operation unit 140 includes one or more of a push switch, a slide switch, a dial switch, a touch panel and the like and is capable of receiving a user operation. The display unit 150 includes a self-emitting display element such as a TFT liquid crystal display panel and a backlight device or an organic EL display element and is capable of displaying information such as images and characters. Note that the display unit 150 includes a display interface, the display interface reads image data written in a VRAM area provided on the RAM 164 and information such as images and characters is displayed on the display unit 150.

The ROM 162 includes a flash memory or the like and stores a control program (firmware) to be executed by the CPU 170, adjustment parameters, or information needed to be retained even in a state where the digital camera 100 is off. The RAM 164 includes an SDRAM 164 or the like and has a relatively high access speed. The CPU 170 interprets/executes the firmware transferred from the ROM 162 to the RAM 164 to centrally control the operation of the digital camera 100.

The DSP 190 generates image data for recording, image data for display or the like by applying various processing described above to a digital image signal temporarily stored in the RAM 164.

The digital camera 100 is capable of generating a posterized image at the time of photographing. Further, a post-processing may be applied to an image obtained by photographing in the past to generate a posterized image.

Figure 2:
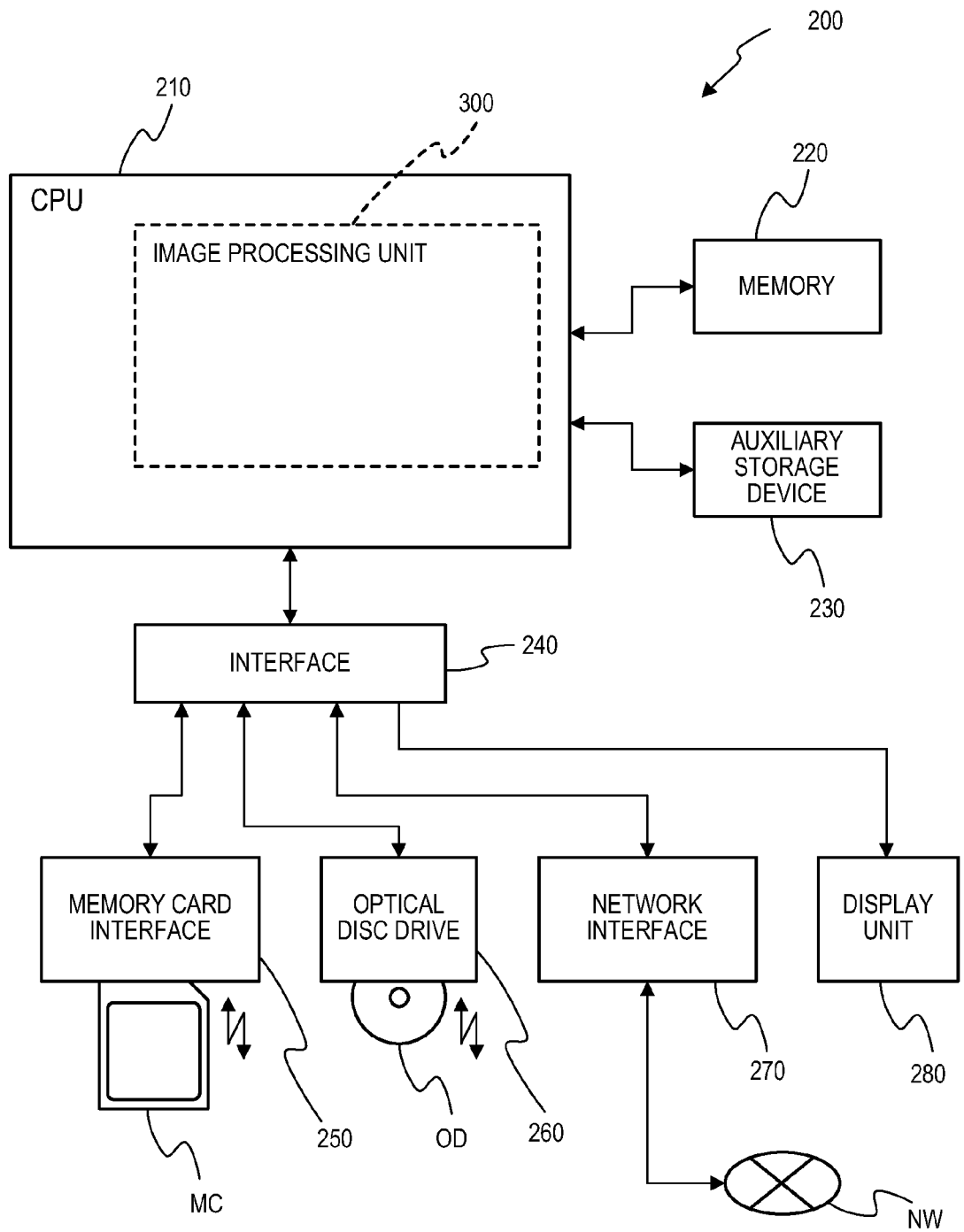
FIG. 2 is a block diagram showing an example of a schematic internal configuration of a computer in which the computer executes an image processing program to realize an image processing unit.

FIG. 2 is a block diagram showing an example in which an image processing program recorded in a recording medium is read and executed by a CPU of a computer, whereby a function as the image processing unit 300 is mounted. A computer 200 includes a CPU 210, a memory 220, an auxiliary storage device 230, an interface 240, a memory card interface 250, an optical disc drive 260, a network interface 270 and a display unit 280. The CPU 210, the memory card interface 250, the optical disc drive 260, the network interface 270 and the display unit 280 are electrically connected via the interface 240.

The memory 220 is a memory having a relatively high access speed such as a DDR or an SDRAM. The auxiliary storage device 230 includes a hard disc drive, a solid-state drive (SSD) or the like and has a relatively large storage capacity.

A memory card MC can be detachably loaded into the memory card interface 250. Image data generated by a photographing operation by a digital camera or the like and stored in the memory card MC can be read into the computer 200 via this memory card interface 250. Further, image data in the computer 200 can be written in the memory card MC.

The optical disc drive 260 reads data from an optical disc OD. The optical disc drive 260 also writes data in the optical disc OD as needed.

The network interface 270 can transfer information between an external information processing apparatus such as a server connected via a network NW and the computer 200.

The display unit 280 includes a flat panel display device or the like and can display characters, icons, color images and the like.

The image processing unit 300 is realized by the CPU 210 interpreting/executing the image processing program loaded onto the memory 220. This image processing program is encoded and recorded in a computer-readable format in a recording medium (recording device) such as the memory card MC or the optical disc OD and distributed to a user of the computer 20. Alternatively, an image processing program downloaded from an external information processing apparatus such as a server via the network NW may be stored in the auxiliary storage device 230. Further, the image processing program may be downloaded from the external information processing apparatus or the like via another wired or wireless interface and stored in the auxiliary storage device 230.

The image processing unit 300 performs image processing to be described later on image data stored in the auxiliary storage device 230 or image data input via the memory card MC, the optical disc OD, the network NW or the like. The processing in the image processing unit 300 is described for two embodiments below. Image data to be processed may be a still image or moving images obtained by photographing using an electronic camera or image data of a still image obtained from a scanner or the like.

—First Embodiment—

Figure 3:
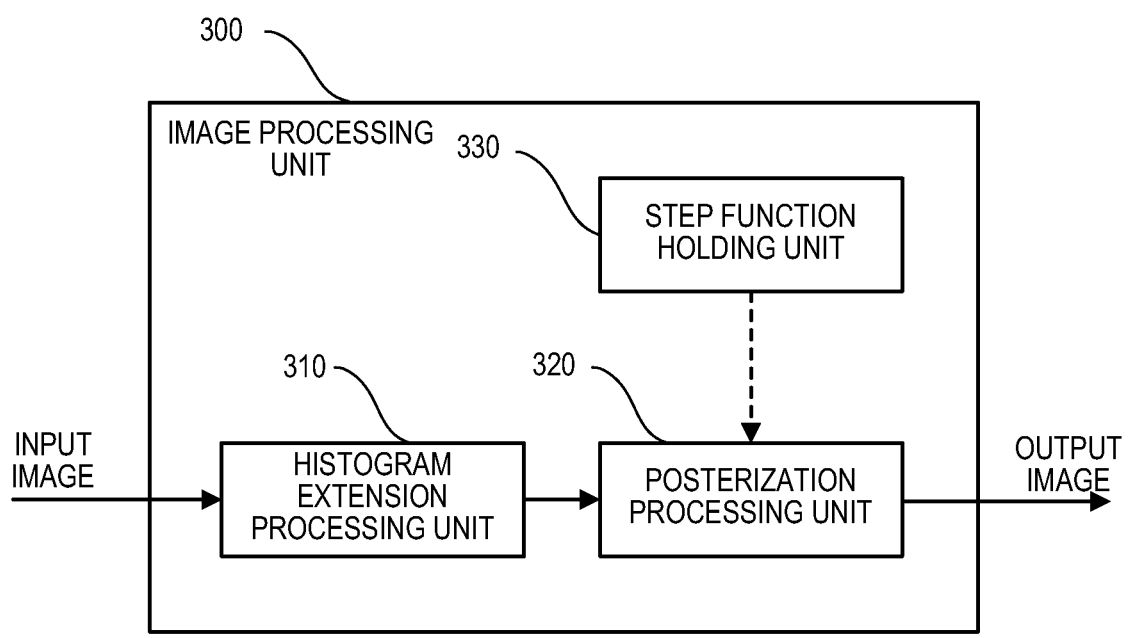
FIG. 3 is a block diagram showing a schematic configuration of the image processing unit according to a first embodiment of the present invention.

FIG. 3 is a block diagram schematically showing the configuration of the image processing unit 300. The image processing unit 300 may be mounted in the DSP 190 in the digital camera 100 or may be realized by the CPU 210 of the computer 200 executing the image processing program as described above.

The image processing unit 300 includes a histogram extension processing unit 310, a posterization processing unit 320 and a step function holding unit 330. An example in which the image processing unit 300 is mounted in the digital camera 100 shown in FIG. 1 is described below. The image processing unit 300 may use image data for live view display as an input image and output image data after processing as an output image to the display unit 150. Alternatively, image data obtained by photographing and performing a series of pre-processing may be used as an input image and image data after processing may be recorded as an output image in the image recording medium 130 or the like. The series of pre-processing include fixed pattern noise removal, analog gain adjustment, A/D conversion, demosaicing, white balance adjustment, noise reduction processing, etc. A processing such as color space conversion may be performed as needed. The image processing unit 300 may also use moving image data obtained during photographing in a moving image recording mode as input images and successively record the image data after processing as output images in the image recording medium 130 or the like.

An input image is input to the histogram extension processing unit 310. After applying a first tone conversion processing to the input image using a first tone conversion characteristic based on an analysis result of a histogram of the input image, the histogram extension processing unit 310 outputs the resulting image to the posterization processing unit 320. The posterization processing unit 320 applies a second tone conversion processing to the image input from the histogram extension processing unit 310 using a second tone conversion characteristic based on information on a step function input from the step function holding unit 330 and outputs the resulting image as an output image. This output image is recorded in the image recording medium 130 after being subjected to post-processing such as unsharp masking and compression.

The processing performed in each processing block described above is described in detail below.

The histogram extension processing unit 310 applies the first tone conversion processing to the input image using the first tone conversion characteristic to increase a variance of a histogram after the first tone conversion processing as compared with a variance of a histogram before the first tone conversion processing. The histogram indicates a frequency distribution of pixel values (tone values) of pixels configuring an input image. Here, "to increase a variance of a histogram" means that a variance of the image after the first tone conversion processing increases when the variances are derived by statistically processing the pixel values of the images before and after the first tone conversion processing respectively. For example, when a mountain-shaped distribution curve becomes such a distribution curve that the height of the mountain shape is reduced and the width of the base thereof is increased, the variance of the histogram increases. In this specification, to change the histogram in this way is called "to extend a histogram distribution" or "to extend the histogram".

A histogram flattening processing can be utilized as the first tone conversion processing. The histogram flattening processing is a processing for obtaining a histogram (frequency distribution) of pixel values of pixels configuring an input image, deriving such a tone conversion characteristic as to more flatten the distribution of frequency belonging to each class of pixel value (that a peak and a valley of the histogram are leveled out to be more flattened), and performing a tone conversion by applying the derived tone conversion characteristic.

Figure 4A:
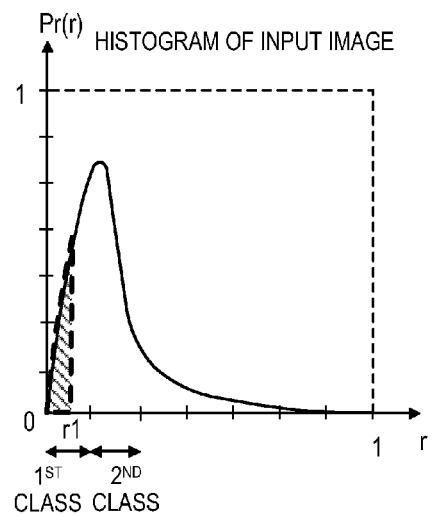
Figure 4B:
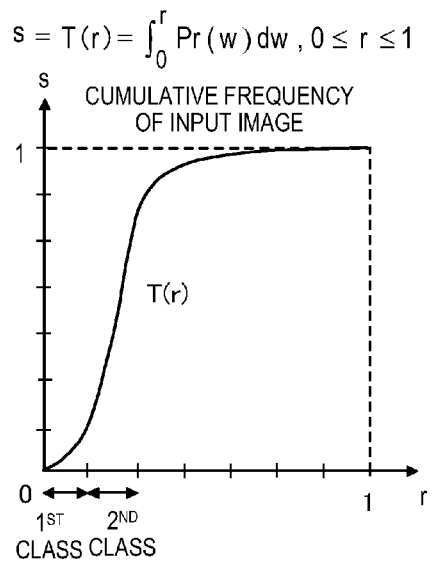
Figure 4C:
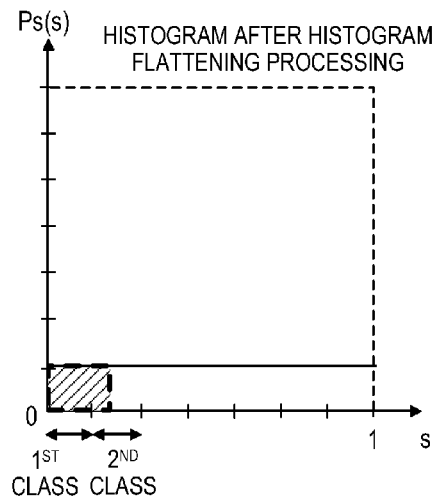

With reference to FIGS. 4A to 4C, an example of the first tone conversion processing is described. In three graphs shown in FIGS. 4A to 4C, a horizontal axis represents pixel value and a vertical axis represents frequency. Both the pixel value and the frequency are normalized so that a minimum value is 0 and a maximum value is 1.

FIG. 4A shows an example of a histogram of an input image. The example shown in FIG. 4A corresponds to an image which is dark as a whole and has low contrast. In FIG. 4A, the pixel values are divided into seven classes and concentrated in the first, second and third classes from the lowest side of the pixel values. A function Pr(r) indicates the frequency of the pixels whose pixel value is r. That is, a histogram curve shown in FIG. 4A is expressed by Pr(r).

FIG. 4B conceptually shows a state where a cumulative frequency curve T(r) is obtained from the pixel values of the image having a histogram characteristic shown in FIG. 4A. A cumulative frequency s of the pixels having a pixel value of 0 to r can be expressed by Equation (1) based on T(r).

$$s = T(r) = \int_0^r Pr(w)dw, \quad 0 \le r \le 1 \tag{1}$$

If the first tone conversion characteristic that is a characteristic of the cumulative frequency expressed by Equation (1) is applied to the input image, a histogram Ps(s) flattened as shown in FIG. 4C is obtained. By performing the histogram flattening processing in this way, the pixels before the first tone conversion processing having a pixel value in the range of 0 to r1 in FIG. 4A are distributed from the first to the second classes in FIG. 4C after the first tone conversion processing.

As described above, the histogram extension processing unit 310 may apply a uniform tone conversion characteristic to all the pixels in the input image or may derive a tone conversion characteristic in a space-variant manner and apply the derived tone conversion characteristic to each pixel as described below.

In an example in which the tone conversion characteristic is applied in a space-variant manner, the histogram extension processing unit 310 defines a partial area surrounding one target pixel in the input image and obtains the histogram Pr(r) as illustrated in FIG. 4A from the pixel values of the pixels included in the defined partial area. The histogram extension processing unit 310 can determine the tone conversion characteristic to more increase a variance of that histogram Pr(r) and apply that tone conversion characteristic to the pixel value of the target pixel. The partial area may be, for example, a rectangular area centered on the target pixel and composed of 31×31 pixels arranged in vertical and horizontal directions. By successively performing this processing for all the pixels in the image, a space-variant histogram extension processing is possible.

At this time, in the case of, for example, setting a target pixel at the outermost edge of an image, it is not possible to define a partial area surrounding this target pixel. This is because there is no pixel at the outer side of the outermost edge of the image. To deal with this, the histogram extension processing unit 310 adds an image in a rectangular frame area surrounding the input image to the input image prior to the above histogram extension processing. When the histogram extension processing unit 310 defines a rectangular area centered on a target pixel and composed of 31×31 pixels arranged in vertical and horizontal directions as in the above example, an image in a frame-like area having a width of 15 pixels may be added to an original input image. At this time, the histogram extension processing unit 310 can copy pixel values in an inner area extending from the outer edge of the original image and having a width of 15 pixels to repeat along the outer edge of the original input image. Further, the histogram extension processing unit 310 can copy pixel values to repeat in a diagonal direction at corner parts. The image thus obtained is discarded after the first tone conversion processing.

In the space-variant tone conversion processing (histogram extension processing) described above, the histogram extension processing unit 310 generates an image after the tone conversion by gathering the pixel values obtained by tone-converting the target pixels instead of successively replacing the pixel values in the input image before the tone conversion by pixel values after the tone conversion. The reason is that, if the pixels tone-converted in the previous processing are included in the partial area set around the target pixel at the time of the space-variant processing, the subsequent processing result is affected.

In another example of the space-variant histogram extension processing, the histogram extension processing unit 310 can extract one area in an input image where a target subject is located and the other area by using a technology such as an image recognition processing, and then perform a histogram extension processing by applying a different tone conversion characteristic to each area.

The posterization processing unit 320 generates a posterized image by performing the second tone conversion processing using the second tone conversion characteristic on an image subjected to the first tone conversion processing by the first tone conversion characteristic in the histogram extension processing unit 310. That is, the posterization processing unit 320 performs a posterization processing on an input image on which a processing of extending a histogram distribution has been performed in the histogram extension processing unit 310. At this time, the posterization processing unit 320 performs the posterization processing by referring to the step function information held in the step function holding unit 330.

Figure 5:
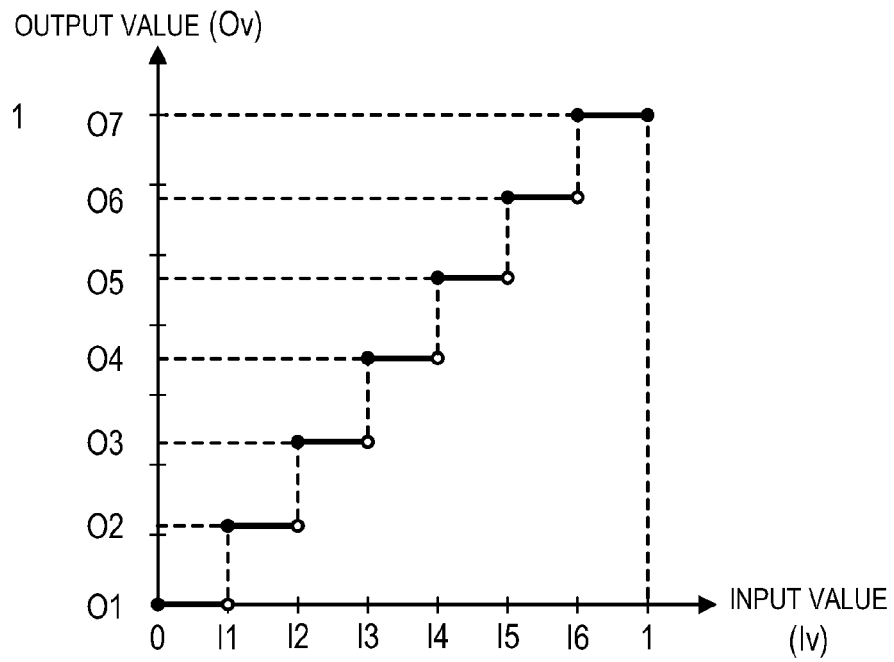
FIG. 5 conceptually shows an example of a tone conversion characteristic set at the time of a posterization processing.

FIG. 5 is a graph conceptually showing an example of the step function held in the step function holding unit 330. This step function specifies the tone conversion characteristic when the posterization processing is performed. In the example shown in FIG. 5, a horizontal axis represents input value and a vertical axis represents output value. Input values (Iv) of 0 to 1 are divided into seven successive sections of $0 \le Iv < I1, I1 \le Iv < I2, \ldots, I6 \le Iv \le 1$, and the step function gives O1, O2, ..., O7 as a corresponding output value (Ov) in response to the input value (Iv) in the range defined by each of the successive sections. The posterization processing unit 320 reduces the tone number (number of tones) of the image after the posterization processing to 7 by performing the second tone conversion processing using this tone conversion characteristic as the second tone conversion characteristic.

In FIG. 5, each black point and each white point added to ends of each line segment representing a tone conversion characteristic respectively indicate to include and not to include the input value corresponding to the end point of each line segment. This is described, taking a line segment at the lower left corner corresponding to $0 \le Iv < I1$ in FIG. 5. A black point is added to the left end of this line segment and a white point is added to the right end. That is, this line segment defines a range not smaller than 0 and smaller than I1.

At the time of the posterization processing, image data comes in various formats (color system, color space) according to the purpose. For example, for image data whose colors of B, G and R are expressed by a bit depth of 8 bits, the posterization processing is possible for each pixel value (0 to 255) of each color. Alternatively, the posterization processing may be performed, for example, by converting an image in the RGB color space into an image in a different color space, e.g. La*b*, HSV or YCbCr. At this time, it is also possible to perform the posterization processing on only L-values, V-values and Y-values in the above color space. The range of values that the input and output values respectively take are not limited to those of from 0 to 1 and 0 to 255, and they can be set at various values. The number of sections set between the minimum and maximum values of the input value can be changed according to the user's preference, required specification or the like. Information on a plurality of step functions may be stored in the step function holding unit 330 and any one of them may be automatically selected or may be selected by the user. Alternatively, the tone conversion characteristic for the posterization processing may be set by the user and information on the step function corresponding to the tone conversion characteristic set by the user may be stored in the step function holding unit 330.

Although an example of setting each of the successive sections of the input values (Iv) to have a substantially equal section length is shown in the step function illustrated in FIG. 5, the successive sections may be set at irregular intervals. Further, although FIG. 5 shows an example of setting the output values O1, O2, ..., O7 corresponding to the respective successive sections of the input values (Iv) substantially at equal intervals, the output values need not necessarily be set in such a manner. In FIG. 5, the output values O1, O2, ..., O7 are respectively set to the minimum values of the ranges of the input values defined in the respective successive sections.

These output values O1, O2, ..., O7 can be set as follows according to the characteristic of the input image.

In a histogram representing a frequency distribution of pixel values of pixels configuring an input image as illustrated in FIG. 4A, class widths in calculating the frequency distribution are set in accordance with the ranges of the input values defined by the respective successive sections of the above step function. In the example of FIG. 5, $0 \leq Iv < I1$, $I1 \leq Iv < I2$, ..., $I6 \leq Iv \leq I1$ are shown as the respective successive sections of the step function. The classes ($1^{st}$, $2^{nd}$, ... in FIGS. 4A to 4C) of the histogram are set to correspond to the respective ranges of the input values defined in these successive sections. An average value is calculated as a representative value for each class based on the pixel values belonging to each class. Besides the average value, a mode, a median or the like may be calculated as the representative value for each class. A representative value corresponding to each class is set as an output value O1, O2, ..., or the like. Output value differences between O1 and O2, O2 and O3, ..., O6 and O7 may be substantially equal or may be different depending on the profile of a histogram of pixel values of an input image.

Either the step function holding unit 330 or the posterization processing unit 320 may adaptively change the tone conversion characteristic used in the posterization processing in the posterization processing unit 320 according to the input image as described above.

Figure 6:
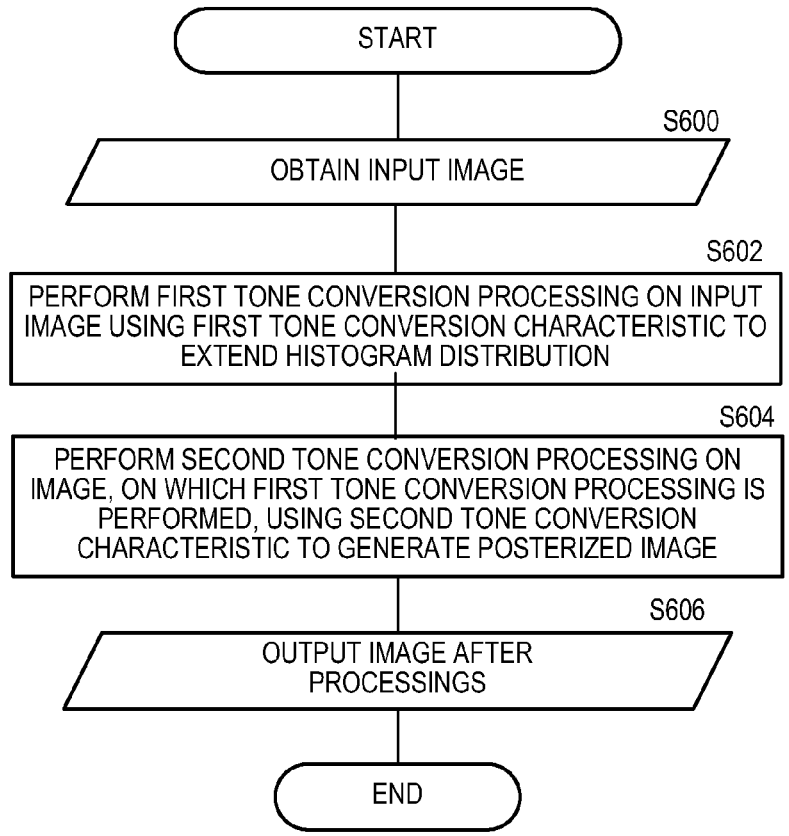
FIG. 6 is a flow chart showing an image processing procedure performed in the image processing unit according to the first embodiment.

FIG. 6 is a flow chart showing a processing procedure in performing the above processing in the image processing unit 300. These processing is performed in the image processing unit 300 of the digital camera 100 described with reference to FIG. 1. Alternatively, they may be performed in the image processing unit 300 of the computer 200 described with reference to FIG. 2.

In S600, the image processing unit 300 obtains an input image. When the image processing unit 300 is built in the digital camera 100, this input image is any one of the following four. In the case of displaying a live-view image during a photographing preparation operation of the digital camera 100, the image processing unit 300 can set this image obtained by imaging for live-view image display as an input image. When the digital camera 100 is operating in a moving image recording mode, the image processing unit 300 can set moving images for recording successively generated during the imaging operation as input images. When the digital camera 100 is operating in a still image recording mode, the image processing unit 300 can set a still image for recording obtained by imaging as an input image. Further, when the digital camera 100 is switched to a reproduction mode and the user operates to generate a posterized image, the image processing unit 300 can set image data corresponding to an image reproduced and displayed based on an image obtained by imaging in the past as an input image.

When the image processing unit 300 is realized by executing the software by the CPU 210 of the computer 200, image data read from the auxiliary storage device 230, the memory MC, the optical disc OD or the like or an image obtained via the network NW can be set as an input image. Alternatively, the image processing unit 300 can set moving images successively input via a USB interface, an HDMI (registered trademark) interface or the like as input images.

In S602, the image processing unit 300 performs the first tone conversion processing on the input image using the first tone conversion characteristic, thereby extending a histogram distribution. A statistical variance derived for pixel values of pixels configuring the input image subjected to the first tone conversion processing in S602 is larger than that of the input image before the first tone conversion processing. The processing performed in S602 corresponds to a processing in the histogram extension processing unit 310 of FIG. 3.

In S604, the image processing unit 300 generates a posterized image by performing the second tone conversion processing using the second tone conversion characteristic in which a relation of an output value to an input value is defined by the step function. The processing performed in S604 corresponds to the tone conversion processing (posterization processing) performed based on information on the step function read from the step function holding unit 330 in the posterization processing unit 320 of FIG. 3.

In S606, the image processing unit 300 outputs an image after the posterization processing. When the image processing unit 300 is built in the digital camera 100, the processing of S606 corresponds to a processing of outputting the image after the posterization processing to the display unit 150 or the image recording medium 130. Further, when the image processing unit 300 is realized by executing the software by the CPU 210 of the computer 200, the processing of S606 corresponds to a processing of outputting the image after the posterization processing to the auxiliary storage device 230, the memory card MC, the optical disc OD, the display unit 280 or the like.

As a result of the processing in the image processing unit 300, in the input image having the histogram illustrated in FIG. 4A, the pixels having the pixel values distributed in the first class come to distribute in the first and second classes as shown in FIG. 4C due to an increase in the variance of the histogram resulting from the first tone conversion processing. As a result, the pixels that would be consolidated into one tone (O1) in the posterized image to lose the tone if they were not subjected to the first tone conversion processing, have two tones (O1, O2) by performing the processing described in this embodiment. As a result, even in the case of obtaining a posterized image from an input image whose tone distribution is skewed to a specific tone, many tones remain in key positions of the image and a sharp and painterly image can be obtained. That is, even if an image has a skewed tone distribution, pixels are more appropriately distributed to various tones and a better looking posterized image is obtained.

Second Embodiment

Figure 7:
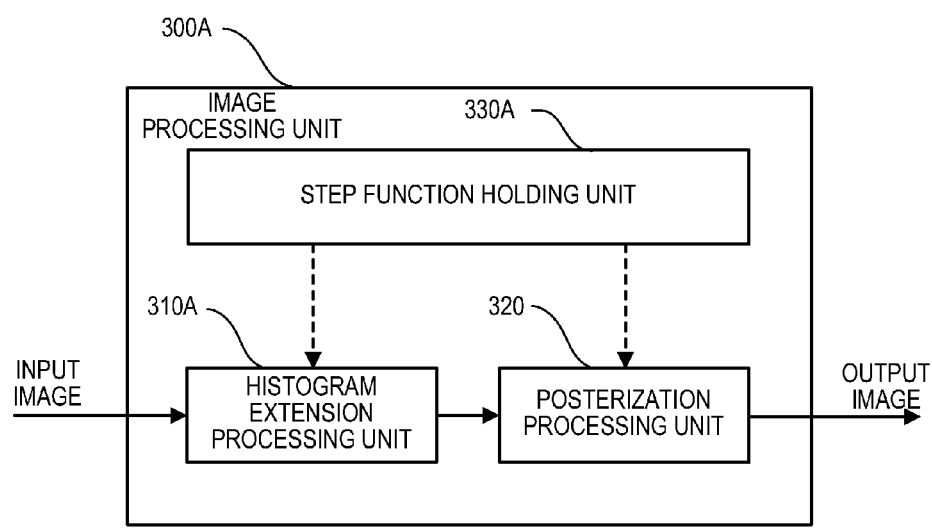
FIG. 7 is a block diagram showing a schematic configuration of an image processing unit according to a second embodiment.

FIG. 7 is a block diagram schematically showing the configuration of an image processing unit 300A according to a second embodiment. The following description is centered on differences from the image processing unit 300 according to the first embodiment. The image processing unit 300A includes a histogram extension processing unit 310A, a posterization processing unit 320 and a step function holding unit 330A. The image processing unit 300A differs from the image processing unit 300 according to the first embodiment in the following two points.

One point is that information on a step function held in the step function holding unit 330A is output not only to the posterization processing unit 320, but also to the histogram extension processing unit 310A. The other point is that the histogram extension processing unit 310A performs a histogram extension processing by referring to the information on the step function output from the step function holding unit 330A. A processing performed in the histogram extension processing unit 310A is described in detail below with reference to FIGS. 8A to 8D, 9A and 9B. In graphs shown in FIGS. 8A to 8D, 9A and 9B, a horizontal axis represents pixel value and a vertical axis represents frequency. Both the pixel value and the frequency are normalized so that a minimum value is 0 and a maximum value is 1.

Figure 8A:
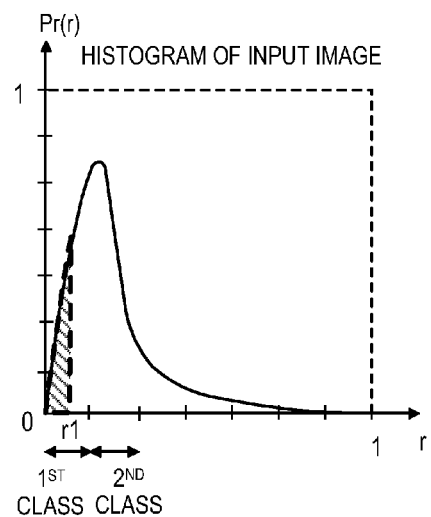

FIG. 8A shows an example of a histogram of an input image. The example shown in FIG. 8A corresponds to an image which is dark as a whole and has low contrast as in FIG. 4A. As in FIG. 4A, pixel values are divided into seven classes and concentrated in the first, second and third classes from the lowest side of the pixel values in FIG. 8A. The frequency of pixels whose pixel value is r is expressed by Pr(r).

Figure 8B:
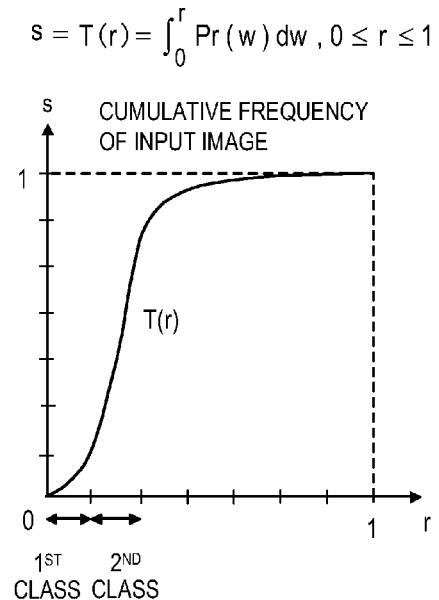

FIG. 8B conceptually shows a state where a cumulative frequency curve T(r) is obtained from the pixel values of the image having a histogram characteristic shown in FIG. 8A. A cumulative frequency s of the pixels having a pixel value of 0 to r can be expressed by Equation (1) described above when being expressed by T(r).

Figure 8C:
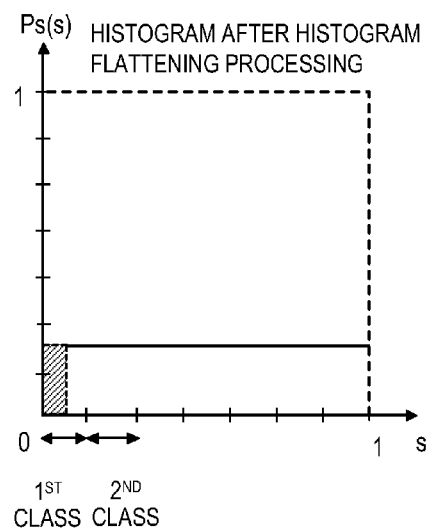

If a tone conversion characteristic that is a characteristic of the cumulative frequency expressed by Equation (1) is applied to an input image, a histogram Ps(s) flattened as shown in FIG. 8C is obtained. A cumulative frequency of pixels having pixel values from 0 to r1 in the input image, i.e. pixels corresponding to a hatched part in FIG. 8A are distributed in a hatched part in a histogram after a histogram flattening processing shown in FIG. 8C after the tone conversion processing. In this example, the pixels having a pixel value of 0 to r1 before the tone conversion processing remain in the first class as shown in FIG. 8C even after the histogram flattening processing. If a posterization processing is performed in this state, tones in dark parts are lost in the image. Thus, an effect of the histogram extension processing cannot be obtained for a part of the image having the pixel value falling within the range of 0 to r1 in the input image.

To deal with this problem, the histogram extension processing unit 310A performs a processing of increasing a variance of a histogram by a method described below in the second embodiment. That is, the histogram extension processing unit 310A sets a target histogram by referring to the step function information input from the step function holding unit 330A. Subsequently, a first tone conversion characteristic is determined based on the set target histogram. Then, a first tone conversion processing is performed based on this first tone conversion characteristic. These processing is described in detail below.

An example of setting the target histogram is as follows. Here is described an example in which the step function information input from the step function holding unit 330A corresponds to the tone conversion characteristic illustrated in FIG. 5. In the tone conversion characteristic illustrated in FIG. 5, the step function is set by dividing input values (Iv) of 0 to 1 into seven successive sections of 0≤Iv<I1, I1≤Iv<I2, . . . , I6≤Iv≤1.

Figure 8D:
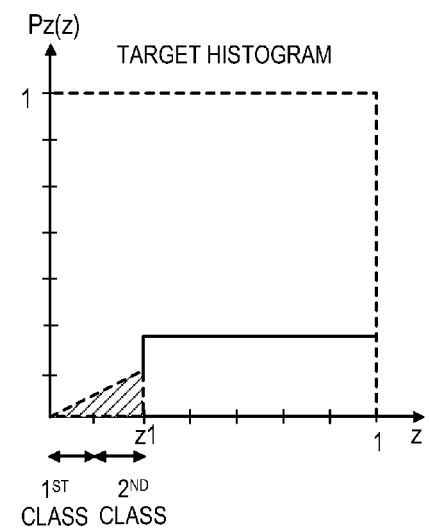
Figure 9A:
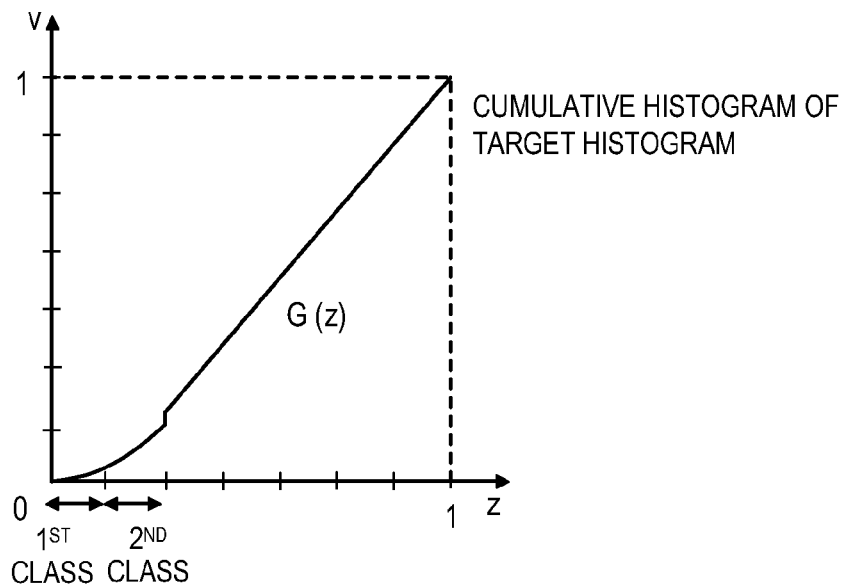
Figure 9B:
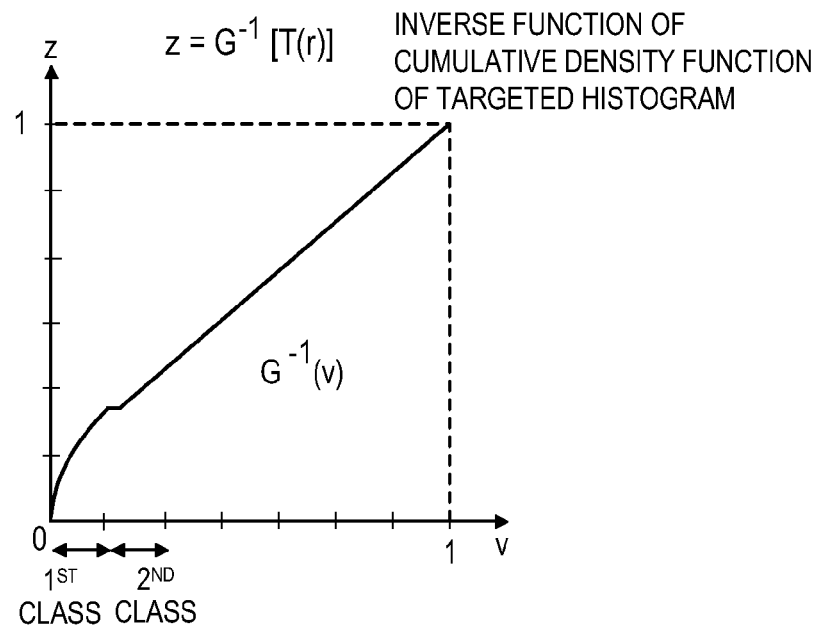

The histogram extension processing unit 310A determines the classes of the histogram in correspondence with the ranges of the input values defined by the aforementioned seven successive sections in the step function. When it is determined to be desirable to keep the tones in a part of the input image before the tone conversion processing having a pixel value of 0 to r1, a target histogram is so determined that these pixels are distributed in the first and second classes. The first and second classes correspond to two successive sections of 0≤Iv<I1 and I1≤Iv<I2. As an example, the target histogram is so determined that the area of a hatched part in FIG. 8A is substantially equal to that of a hatched part in FIG. 8D. The profile of the target histogram shown in FIG. 8D is an example and can be set at an arbitrary profile. The target histogram can also be so determined as to distribute the pixels not only in the two first and second classes, but also in three or more classes. A user may set the target histogram while viewing a preview image displayed on the display unit. Although the profile is flat in the third and subsequent classes in FIG. 8D, various profiles can be set according to the characteristic and the like of the input image.

The histogram extension processing unit 310A derives a cumulative density function of a targeted histogram by following Equation (2) from the target histogram set as illustrated in FIG. 8D.

$$v = G(z) = \int_0^z Pz(w)dw, \ 0 \le z \le 1 \quad (2)$$

A graph of the cumulative density function G(z) of the targeted histogram described above is shown in FIG. 9A. The histogram extension processing unit 310A calculates an inverse function of the cumulative density function of the targeted histogram, i.e.

$$z = G^{-1}[T(r)] \quad (3)$$

The histogram extension processing unit 310A performs a first tone conversion processing using this inverse function as a first tone conversion characteristic. In this way, the histogram of the pixel values of the pixels configuring the input image is changed to approximate to the target histogram.

At the time of the above histogram extension processing, a uniform tone conversion characteristic can be applied to all the pixels so that the histogram derived from the pixel values of all the pixels of the input image approaches the targeted histogram. Alternatively, a tone conversion characteristic derived in a space-variant manner is used by the method described in the first embodiment.

The image on which the first tone conversion processing is performed as described above is processed in the posterization processing unit 320 to generate a posterized image.

At the time of the posterization processing, a second tone conversion processing is performed using the step function described with reference to FIG. 5 in the first embodiment as a second tone conversion characteristic. The step function is the same as in the first embodiment. That is, the step function set as a default may be uniformly applied to various input images. A relation of an output value to an input value in the step function may be changed according to a histogram characteristic of an input image.

Figure 10:
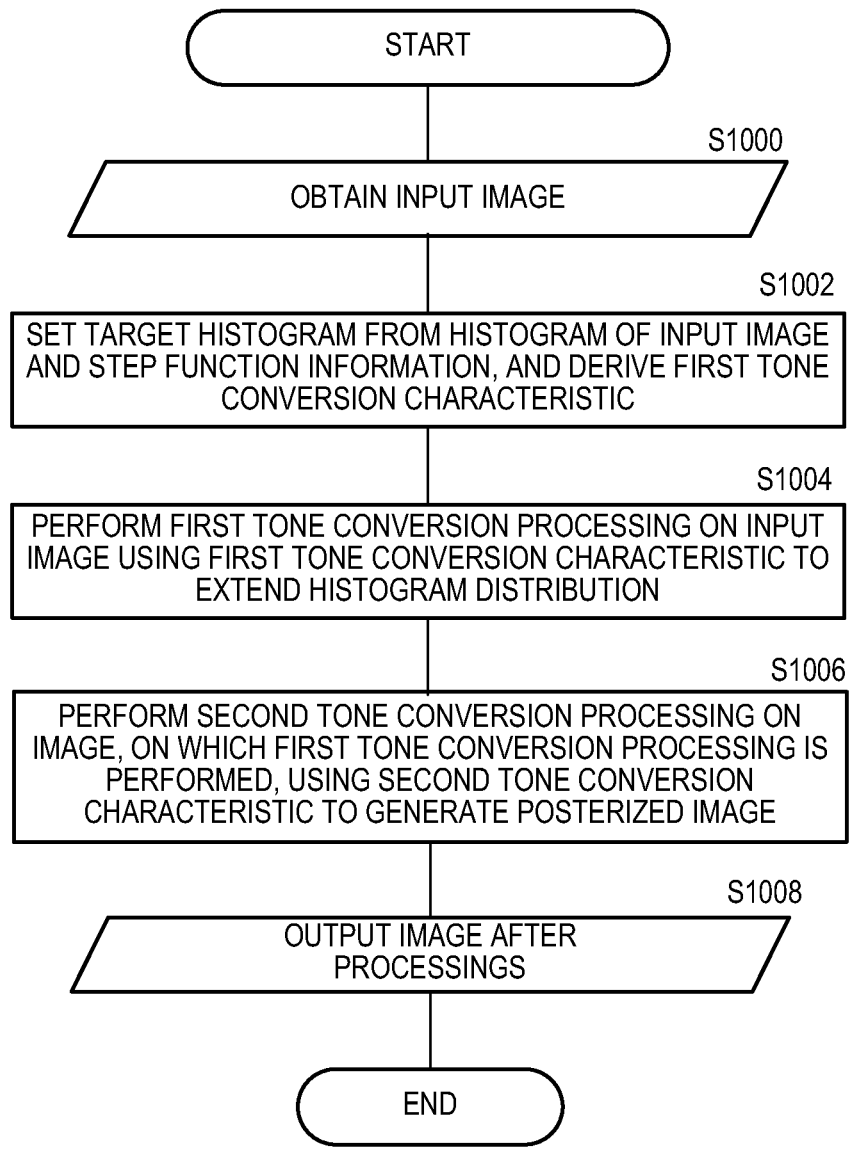
FIG. 10 is a flow chart showing an image processing procedure performed by the image processing unit according to the second embodiment.

FIG. 10 is a flow chart showing a processing procedure in performing the above processing in the image processing unit 300A. This processing is performed in the digital camera 100 described with reference to FIG. 1 or in the computer 200 described with reference to FIG. 2.

In S1000, the image processing unit 300A obtains an input image. This processing corresponds to the processing of S600 in the flow chart of FIG. 6 in the first embodiment.

In S1002, the image processing unit 300A sets a target histogram based on a histogram derived from pixel values of pixels configuring the input image and the step function information read from the step function holding unit 330A and derives a first tone conversion characteristic.

In S1004, the image processing unit 300A performs a first tone conversion processing on the input image using the first tone conversion characteristic, thereby extending a histogram distribution. The processing in S1002 and S1004 described above corresponds to the processing in the histogram extension processing unit 310A described with reference to FIGS. 8A to 8D, 9A and 9B.

In S1006, the image processing unit 300A generates a posterized image by performing a second tone conversion processing using a second tone conversion characteristic in which the relation of an output value to an input value is defined by the step function. The processing performed in S1006 corresponds to the tone conversion processing (posterization processing) performed based on the information on the step function read from the step function holding unit 330A in the posterization processing unit 320 of FIG. 7.

In S1008, the image processing unit 300A outputs an image after the posterization processing. This processing corresponds to the processing in S606 in the flow chart of FIG. 6 in the first embodiment.

As a result of the processing in the image processing unit 300A, in the input image having the histogram illustrated in FIG. 8A, the pixels having the pixel values distributed in the range of 0 to r1 come to be distributed in the first and second classes as shown in FIG. 8D due to an increase in the variance of the histogram resulting from the first tone conversion processing. As a result, the pixels that would be consolidated into one tone in the posterized image to lose the tone if they were not subjected to the first tone conversion processing, have two tones by performing the processing described in this embodiment.

As just described, according to the second embodiment, the first tone conversion characteristic is derived from the histogram of the input image and the step function information for the posterization processing. As a result, even in the case of obtaining a posterized image from an input image whose tone distribution is skewed to a specific tone, many tones remain in key positions of the image and a sharp and painterly image can be obtained by more appropriately distributing pixels to various tones.

Third Embodiment

Figure 11:
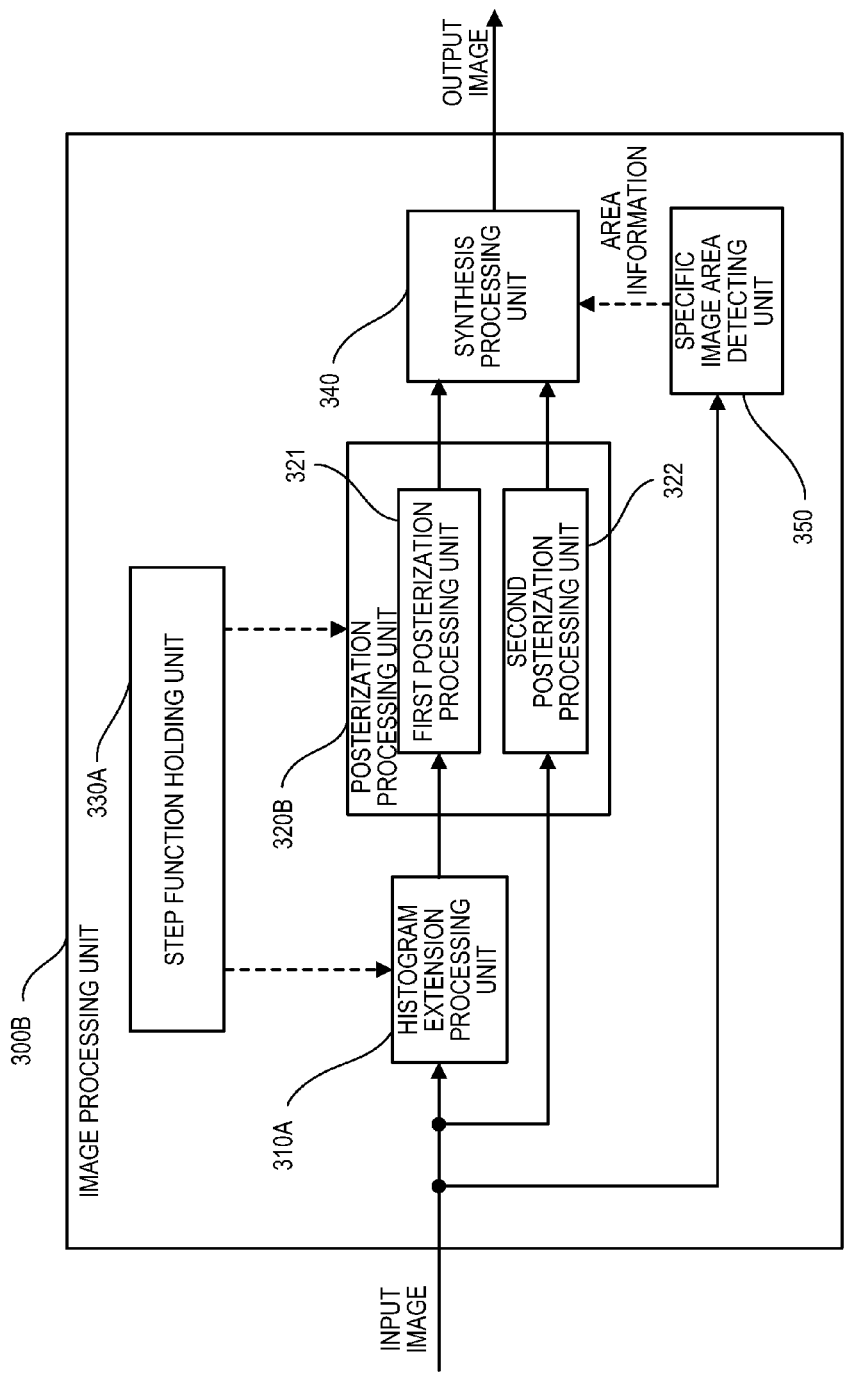
FIG. 11 is a block diagram showing a schematic configuration of an image processing unit according to a third embodiment.

FIG. 11 is a block diagram schematically showing the configuration of an image processing unit 300B according to a third embodiment. The following description is centered on differences from the image processing unit 300A according to the second embodiment. The image processing unit 300B includes a histogram extension processing unit 310A, a posterization processing unit 320B, a step function holding unit 330A, a synthesis processing unit 340 and a specific image area detecting unit 350. The posterization processing unit 320B includes a first posterization processing unit 321 and a second posterization processing unit 322.

The histogram extension processing unit 310A performs a processing similar to the one described with reference to FIGS. 8A to 8D, 9A and 9B in the second embodiment. That is, the histogram extension processing unit 310A sets a target histogram based on a histogram derived from pixel values of pixels configuring the input image and step function information read from the step function holding unit 330A and derives a first tone conversion characteristic. Then, the histogram extension processing unit 310A performs a first tone conversion processing using the derived first tone conversion characteristic and outputs an image with an increased variance of the histogram to the first posterization processing unit 321 in the posterization processing unit 320B. At this time, as a first tone conversion characteristic, a uniform tone conversion characteristic may be applied to all the pixels of the input image as described in the first and second embodiments or a tone conversion characteristic derived in a space-variant manner may be applied to each pixel.

The first posterization processing unit 321 performs a second tone conversion processing on the image output from the histogram extension processing unit 310A using a second tone conversion characteristic based on the step function information output from the step function holding unit 330A. The second posterization processing unit 322 performs the second tone conversion processing on an input image, which is not processed in the histogram extension processing unit 310A, using the second tone conversion characteristic based on the step function information output from the step function holding unit 330A.

The step function is the same as described in the first embodiment. That is, the step function set as a default may be uniformly applied to various input images. A relation of an output value to an input value in the step function may be changed according to a histogram characteristic of an input image.

The specific image area detecting unit 350 performs a processing of analyzing the input image and detecting an area in the input image where an image of a specific subject is located (hereinafter, referred to as a specific image area). The specific image area detecting unit 350 outputs area information capable of specifying the specific image area in the input image to the synthesis processing unit 340 when the specific image area is detected. The number of specific image areas to be detected in one input image by the specific image area detecting unit 350 may be one or more. Here is described a case where the specific subject is a face and the specific image area is an area where an image of the face is located.

The synthesis processing unit 340 performs a processing of generating an output image by synthesizing images generated by the first and second posterization processing units 321, 322. At this time, the synthesis processing unit 340 changes a synthesis ratio used in synthesizing the two images, between an area of the image where the face image is located and the other area, by referring to face area information output from the specific image area detecting unit 350. For example, it is possible to perform such a synthesis processing that the synthesis ratio of the image generated by the second posterization processing unit 322 is higher in the part where the face image is present. Similarly, it is possible to perform such a synthesis processing that the synthesis ratio of the image generated by the first posterization processing unit 321 is higher in the part where the face image is absent.

A ratio such as 1:0 or 0:1 may be set as the synthesis ratio. In such a case, either one of the images generated by the first and second posterization processing units 321, 322 is selected depending on the position of the image after the synthesis. Alternatively, 1:9, 6:4, 5:5 or the like may be set and the two images may be mixed at an appropriate mixing ratio. In such a case, the images can be smoothly joined by gradually changing the synthesis ratio between the part where the face image is present and the other part.

The synthesis processing unit 340 may adjust brightness so that an image in the part where the face image is present is appropriately bright in performing the above synthesis processing.

Figure 12:
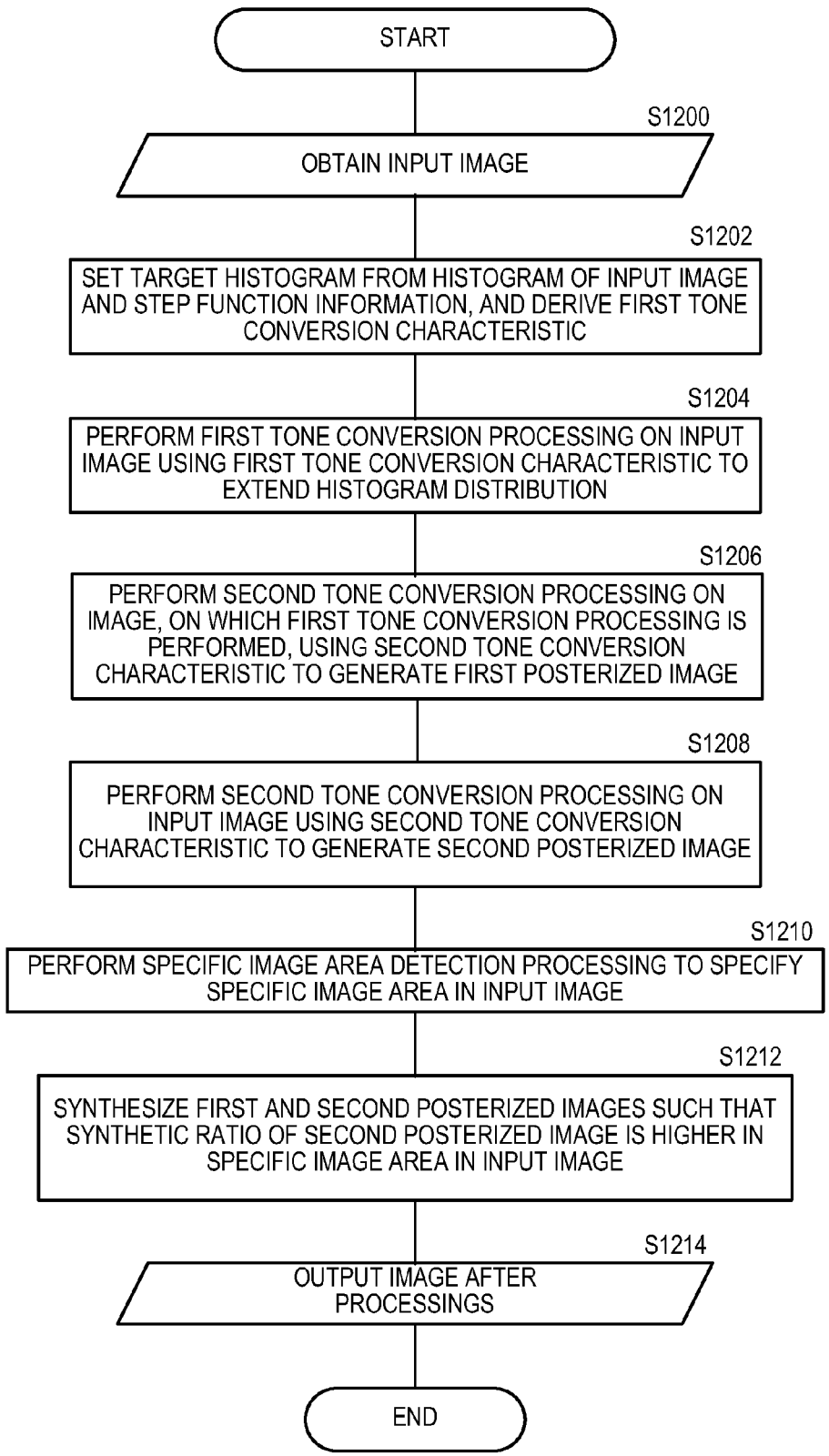
FIG. 12 is a flow chart showing an image processing procedure performed by the image processing unit according to the third embodiment.

FIG. 12 is a flow chart showing a processing procedure in performing the above processing in the image processing unit 300B. This processing is performed in the digital camera 100 described with reference to FIG. 1 or in the computer 200 described with reference to FIG. 2.

In S1200, the image processing unit 300B obtains an input image. This processing corresponds to the processing of S600 in the flow chart of FIG. 6 in the first embodiment.

In S1202, the image processing unit 300B sets a target histogram based on a histogram derived from pixel values of pixels configuring the input image and the step function information read from the step function holding unit 330A and derives a first tone conversion characteristic.

In S1204, the image processing unit 300B performs a first tone conversion processing on the input image using the first tone conversion characteristic, thereby extending a histogram distribution. The processing in S1202 and S1204 described above correspond to the processing in the histogram extension processing unit 310A shown in FIG. 11.

In S1206, the image processing unit 300B performs a second tone conversion processing on the image tone-converted in S1204 using a second tone conversion characteristic, thereby generating a first posterized image. The processing performed in S1206 corresponds to the processing performed in the first posterization processing unit 321 of FIG. 11.

In S1208, the image processing unit 300B performs the second tone conversion processing on the input image obtained in S1200 using the second tone conversion characteristic, thereby generating a second posterized image. The processing performed in S1208 corresponds to the processing performed in the second posterization processing unit 322 of FIG. 11.

In S1210, the image processing unit 300B performs a specific image area detection processing of analyzing the input image obtained in S1200 and specifying a specific image area in the input image. In this example, the specific image area detection processing is a face detection processing and the specific image area is a face area. The processing performed in S1210 corresponds to the processing performed in the specific image area detecting unit 350 of FIG. 11.

In S1212, the image processing unit 300B performs the processing of synthesizing the first and second posterized images. At this time, the image processing unit 300B performs the above synthesis processing to increase the synthesis ratio of the second posterized image in the specific image area (face area in this example) in the synthesized image based on the result of the specific area detection processing in S1210. The processing performed in S1212 corresponds to the processing performed in the synthesis processing unit 340 of FIG. 11.

In S1214, the image processing unit 300B outputs the image after the processing. This processing corresponds to the processing in S606 in the flow chart of FIG. 6 in the first embodiment.

In the above description, the posterization processing unit 320B includes the first posterization processing unit 321 and the second posterization processing unit 322. However, the posterization processing unit 320B may not necessarily include these two posterization processing units 321, 322. That is, the input image and the image processed in the histogram extension processing unit 310A may be processed in a time-series manner in one posterization processing unit and the image after the posterization processing may be temporarily stored.

Further, the image processing unit 300B may include the histogram extension processing unit 310 described in the first embodiment instead of the histogram extension processing unit 310A. In this case, the histogram extension processing is performed as the first tone conversion processing without referring to the step function information output from the step function holding unit 330A.

By performing the above processing in the image processing unit 300B, a sharp and painterly image can be obtained even from an image whose tone distribution is skewed to a specific tone. Further, it can be prevented that an area of an input image where a specific image area (e.g. face image) is located becomes sharp.

In the above described example, the part where the face image is located is prevented from becoming sharp. However, a processing similar to the above may be performed by detecting an area desired not to be sharp (e.g. area where the sky is located) or the like without limitation to the face.

Further, the user may designate a specific subject and a processing similar to the above may be performed on an area where an image of the subject designated by the user is located.

The present invention is applicable to products such as standing cameras for broadcasting, ENG cameras, consumer handy cameras and digital cameras. Further, the image processing of the present invention can be applied to image editing apparatuses, video recorders and the like. Furthermore, the image processing of the present invention can also be applied to image processing programs for processing still images and moving images.

Although the present invention has been described above based on several embodiments, it is not limited to the embodiments described above and various modifications and applications are possible within the scope of the technical concept of the present invention.

Various inventions can be extracted from the above embodiments. For example, if effects can be obtained even if some elements are deleted from all the elements disclosed in the embodiments, configurations having these elements deleted therefrom can also be extracted as inventions.

The present application claims a priority based on Japanese Patent Application No. 2011-205607 filed with the Japan Patent Office on Sep. 21, 2011, all the contents of which are hereby incorporated by reference.

What is claimed is:

1. An image processing apparatus, comprising:
 a histogram extension processing unit for performing a first tone conversion processing on an input image using a first tone conversion characteristic so that a variance of a histogram of pixel values relating to an image after the first tone conversion processing is larger than that of a histogram of pixel values relating to the image before the first tone conversion processing; and
 a posterization processing unit for performing a second tone conversion processing on the image processed in the histogram extension processing unit using a second tone conversion characteristic in which a relation of an output value to an input value is defined by a step function, thereby generating a posterized image whose tone number is reduced as compared with the image before the second tone conversion processing.

2. The image processing apparatus according to claim 1, wherein the histogram extension processing unit determines the first tone conversion characteristic based on the frequency of pixel values belonging to a class in the histogram of the image before being processed in the histogram extension processing unit, the class corresponding to the range of input values defined by each of a plurality of successive sections in the step function.

3. The image processing apparatus according to claim 2, wherein the histogram extension processing unit determines the first tone conversion characteristic so that the pixel values belonging to one class in the histogram of the image before being processed in the histogram extension processing unit are distributed in a plurality of classes after the first tone conversion processing, the one class corresponding to the range of the input values defined by one successive section in the step function, the plurality of adjacent classes corresponding to the ranges of the input values defined by a plurality of adjacent successive sections in the step function.

4. The image processing apparatus according to claim 1, wherein the histogram extension processing unit performs the first tone conversion processing by dividing the input image into a plurality of areas and deriving the first tone conversion characteristic independently for each area.

5. The image processing apparatus according to claim 1, further comprising:
 a specific image area detecting unit for detecting a specific image area where an image of a specific subject is located, in the input image; and
 a synthesis processing unit for setting different synthesis ratios in correspondence with the specific image area and the other area and synthesizing a first posterized image and a second posterized image into one image;

wherein the posterization processing unit generates the first posterized image by performing the second tone conversion processing on the image subjected to the processing of the histogram extension processing unit and generates the second posterized image by performing the second tone conversion processing on the image not subjected to the processing of the histogram extension processing unit.

6. The image processing apparatus according to claim 5, wherein the specific image area detecting unit detects an area where an image of a face is located; and wherein the synthesis processing unit increases a synthesis ratio of the second posterized image in the area where the image of the face is located.

7. The image processing apparatus according to claim 5, wherein the specific image area detecting unit detects an area where an image of the sky is located; and wherein the synthesis processing unit increases a synthesis ratio of the second posterized image in the area where the image of the sky is located.

8. The image processing apparatus according to claim 5, wherein the specific image area detecting unit detects an area where an image of a subject designated by a user is located; and wherein the synthesis processing unit increases a synthesis ratio of the second posterized image in the area where the image of the subject designated by the user is located.

9. The image processing apparatus according to claim 1, wherein the first tone conversion processing is a processing of tone conversion to more flatten the histogram of the pixel values of the input image.

10. The image processing apparatus according to claim 1, wherein the second tone conversion characteristic is derived based on a frequency distribution of the pixel values of the input image.

11. The image processing apparatus according to claim 10, wherein the posterization processing unit:

classifies the pixel values of the input image by the classes set in correspondence with the ranges of the input values respectively defined by the plurality of successive sections in the step function of the second tone conversion characteristic; and determines a pixel value determined as a value representing the class based on any one of a mode, an average value and a median of the pixel values classified into the class as an output value corresponding to the range of the input values for each class.

12. An image processing method, comprising:

performing a first tone conversion processing on an input image using a first tone conversion characteristic so that a variance of a histogram of pixel values relating to an image after the first tone conversion processing is larger than that of a histogram of pixel values relating to the image before the first tone conversion processing; and performing a second tone conversion processing on the image, on which the first tone conversion processing is performed, using a second tone conversion characteristic in which a relation of an output value to an input value is defined by a step function, thereby generating a posterized image whose tone number is reduced as compared with the image before the second tone conversion processing.

13. A non-transitory computer readable recording medium having stored thereon an image processing program configured to control a computer to perform functions comprising:

performing a first tone conversion processing on an input image using a first tone conversion characteristic so that a variance of a histogram of pixel values relating to an image after the first tone conversion processing is larger than that of a histogram of pixel values relating to the image before the first tone conversion processing; and performing a second tone conversion processing on the image subjected to the first tone conversion processing, using a second tone conversion characteristic in which a relation of an output value to an input value is defined by a step function, thereby generating a posterized image whose tone number is reduced as compared with the image before the second tone conversion processing.

* * * * *